Aug. 6, 1929.   P. M. GELATT   1,723,275
ELECTRICAL INDICATING INSTRUMENT
Filed Aug. 24, 1925
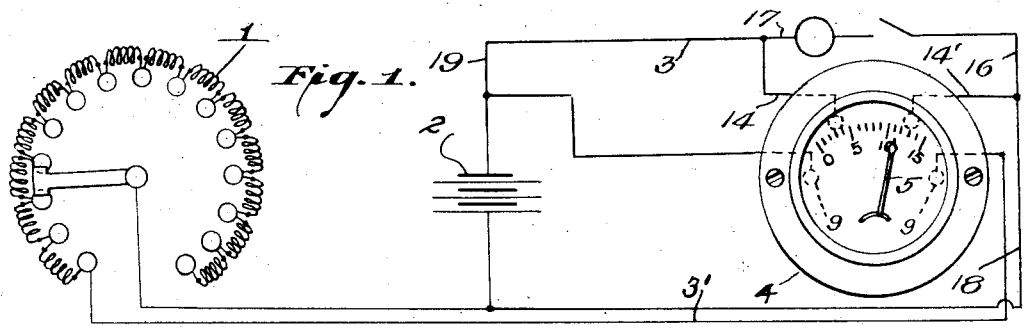
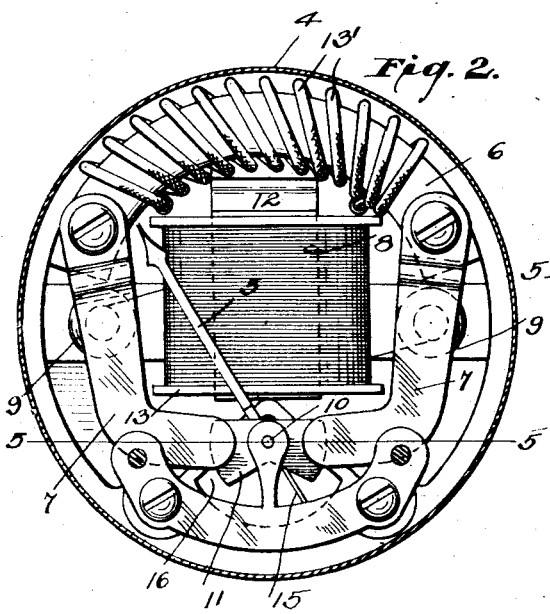
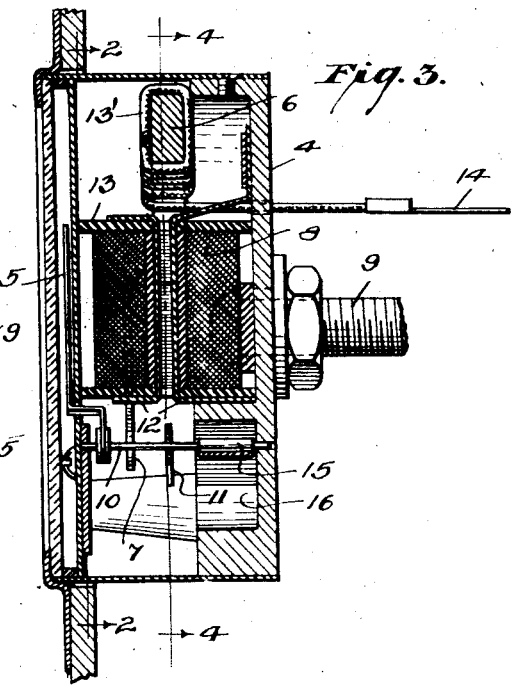
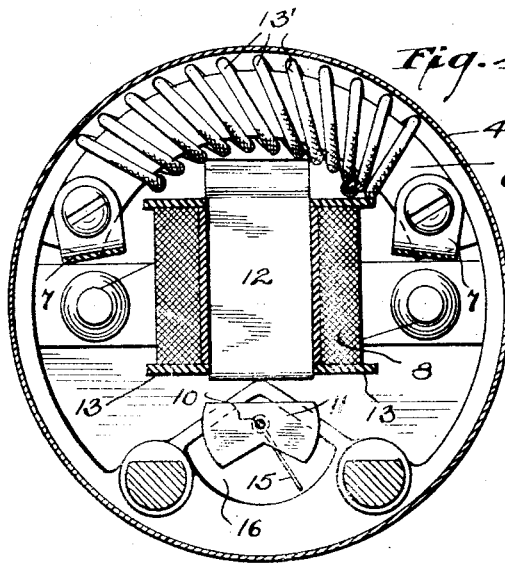
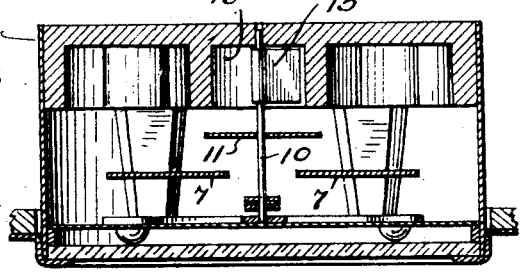
Inventor
Philo M. Gelatt
By Stanley D. Bowman
Attorneys Patented Aug. 6, 1929.

1,723,275

UNITED STATES PATENT OFFICE.

PHILO M. GELATT, OF LA CROSSE, WISCONSIN, ASSIGNOR, BY MESNE ASSIGNMENTS, TO NATIONAL GAUGE & EQUIPMENT COMPANY, OF WILMINGTON, DELAWARE, A CORPORATION OF DELAWARE.

ELECTRICAL INDICATING INSTRUMENT.

Application filed August 24, 1925. Serial No. 52,190.

This invention relates to electrical indicating instruments and particularly for automobile use wherein the indicator is preferably located at some distance from the tank. The improvement relates particularly to that type of improved electric gasoline indicator illustrated in Letters Patent No. 1,522,355 issued to B. F. Winterhoff January 6, 1925, and the improvement is particularly directed to overcoming defects in that type of indicator, due to the fact that when the generator charges the battery there is caused thereby a material variation in the voltage of the current that passes through the coil of the volt meter, and consequently the instrument, properly calibrated for the primary current developed by the battery, will not be properly calibrated for the change in current brought about by the generator charging the battery. This improvement is designed to compensate for those proportional variations in the voltage of the different currents developed by the battery and by the generator, and this improvement is so arranged in its relation to the standard equipment of an automobile that it will automatically compensate for the increased voltage of the current developed by the generator and will not be affected by the varying voltages resulting from charged conditions normally occurring in the usual type of circuit such as the generator being cut in or out or the battery being discharged to a material extent.

Fig. 1 is a diagrammatic view showing the ordinary type of rheostat in circuit with the battery and voltmeter.

Fig. 2 is a section taken on the line 2—2 of Fig. 3 with the cap and dial removed to permit a view of the parts secured within the instrument.

Fig. 3 is a transverse sectional view.

Fig. 4 is a sectional view on the line 4—4 of Fig. 3.

Fig. 5 is a cross sectional view on the line 5—5 of Fig. 2.

Like parts are indicated by like figures of reference throughout the different views.

Referring to Fig. 1 of the drawings, 1 indicates the rheostat which is of the ordinary type illustrated in said Letters Patent to Winterhoff No. 1,522,355 and the arm of this rheostat may be connected to a float member or any other suitable means in the manner fully shown and described in the said Winterhoff patent. 2 indicates a source of electrical supply shown for illustrative purposes only as the battery in the present case and 4 indicates the electromagnetically-operated instrument containing the improvement hereinafter more fully described. As indicated in Fig. 1, the instrument 4 is placed in circuit with the battery and rheostat through the wires 3 and 3' so that the indicator of the instrument 4 will be responsive to movement of the arm of the rheostat and the marking of the dial is so arranged as to indicate the amount of gasoline in the tank by the position of the indicator 5 in its relation to the dial of the instrument 4, this being fully described in the Letters Patent aforesaid.

This improvement concerns itself with the construction of the instrument 4 and its arrangement whereby an accurate indication by the instrument will be maintained whether the current is one developed by the battery or the generator. The general type of instrument is one that is well known and consists of a permanent magnet 6 with attenuated pole pieces 7 and the magnet 6 and pole pieces 7 are secured to the casing of the instrument in the usual and ordinary way as best illustrated in the reissue patent to Axen No. 14,733. The permanent magnet is preferably made of steel and of such magnetic design that it is not entirely saturated with the permanent magnetism.

There is the usual coil 8 the terminals of which are secured to the posts 9 and this coil is connected in the usual and ordinary way so that the indicator 5 of the instrument will indicate the amount of current passing through the coil. The indicating pointer 5 is secured upon the shaft 10 which in turn is secured in bearings in the usual and ordinary way as fully described in said Axen patent and indicated in Fig. 5. This indicator shaft 10 carries an armature 11 and this armature lies below and in close proximity to the ends of the attenuated pole pieces 7. The coil 8 is wound about metal holders 12 (see Fig. 3) and these metal pieces are secured to fibrous members 13. In this specific form of coil arrangement illustrated herein there is a space between the companion plates 12, and one end of the armature 11 in its oscillations will enter within said space.

The permanent magnet 6 is shown partially surrounded by a coil of wire 13' and this coil has terminals 14 and 14' which are connected to the generator G through the wires 16 and 17, with the circuit preferably controlled by the switch S which may be of any general type such as the ordinary cut-out or relay switch, as indicated in Fig. 1, whereby the coil is put in series with the generator. The coil 13 is also connected in series with the battery 2 thru the respective connections 14', 18 and 14, 19. The leads from the generator for charging the battery are shown diagrammatically as thru wires 16, 18, and 17, 19, the result being that when the generator charges the battery the magnet will be correspondingly excited to compensate for this change in voltage of the current generated by the generator and to also compensate in general for any variations of voltage at the source such as a low battery. Consequently the strength of the magnet will always fluctuate to compensate for the proportional increases in voltage and the instrument 4 will indicate properly under all conditions. By reason of the fact that the magnet 6 is not permanently saturated by magnetism, the current passing through the coil 13 will increase the magnetic field of said magnet.

As indicated in Figs. 3 and 5, the instrument 4 is arranged to be attached to the cowl of an automobile or any similar part so that this instrument 4 can be placed at considerable distance from the gasoline tank and still give the proper indication of the amount of gasoline within the tank. The tail piece 15 (see Fig. 2) is in effect an ordinary butterfly valve which oscillates within the chamber 16 and thereby prevents undue oscillations of the indicator 5 in the manner described in the Axen and other patents.

Having thus described my invention, I claim:

1. In an indicating instrument of the character described the combination of a permanent magnet, a main voltage coil, an armature pivoted in the fields of said magnet and coil, said magnet and coil being adapted to act on said armature in opposition, one to the other, and an auxiliary series coil for increasing the effect of said permanent magnet in accordance with an increase in voltage, of the charging current.

2. In a differential galvanometer of the character described the combination of an armature, a permanent magnet for determining the initial position of said armature, a main coil forming an electro-magnet adapted to act on said armature in opposition to said permanent magnet, and an auxiliary coil around said permanent magnet and a charging member connected in the circuit in a manner to increase the effect of said permanent magnet and to thereby compensate for variations of voltage due to the charging member.

3. In an indicating instrument of the character described, a pivoted armature, a permanent magnet for establishing the initial position of said armature, a main coil adapted to be connected in a circuit to be measured for influencing the position of the armature in accordance with the variations to be measured, and an auxiliary coil and generator adapted to be connected in the circuit, the current therein varying in accordance with variations of voltage of the generator and arranged to supply a magnetic field acting in the same direction as said permanent magnet, to compensate for variations in voltage due to said generator.

4. In an indicating instrument of the character described, a first coil adapted to be connected in a variable current circuit to be measured, a permanent magnet, an armature pivoted in the fields of both said magnet and coil and acted on thereby in opposite directions, and a second coil and a generator adapted to be connected directly to the same and arranged to strengthen the field of the permanent magnet in accordance with any increase in voltage at said generator thereby compensating for variations in said voltage.

In testimony whereof, I have hereunto set my hand this 18th day of August 1925.

PHILO M. GELATT.